United States Patent
Du Ross et al.

[15] 3,647,477
[45] Mar. 7, 1972

[54] SURFACTANT COMPOSITION FOR FROZEN CONFECTIONS

[72] Inventors: James W. Du Ross, Claymont; Gabriel P. Lensack, Wilmington, both of Del.

[73] Assignee: Atlas Chemical Industries, Inc., Wilmington, Del.

[22] Filed: Feb. 10, 1970

[21] Appl. No.: 10,267

Related U.S. Application Data

[63] Continuation-in-part of Ser. No. 807,988, Mar. 17, 1969, abandoned.

[52] U.S. Cl............................................99/136, 260/410.6
[51] Int. Cl.............................................................A23g 5/00
[58] Field of Search......................99/136; 260/410.6, 347.4; 252/311.5

[56] References Cited

UNITED STATES PATENTS

| 2,322,820 | 6/1943 | Brown | 260/347.4 |
| 2,374,931 | 5/1945 | Griffin | 106/211 |
| 3,124,464 | 3/1964 | Knightly | 99/136 |
| 3,355,300 | 11/1967 | Avedidian | 99/136 |

Primary Examiner—Raymond N. Jones
Assistant Examiner—J. M. Hunter
Attorney—Kenneth E. Mulford, Roger R. Horton and Ernest G. Almy

[57] ABSTRACT

Ethylene oxide adducts of partial esters of sorbitan and mixed saturated and unsaturated long chain fatty acid and of mixed partial esters of sorbitan and saturated long chain fatty acid and of sorbitan and unsaturated long chain fatty acid are provided as surfactant materials useful, for example, in the preparation of frozen confections.

12 Claims, No Drawings

SURFACTANT COMPOSITION FOR FROZEN CONFECTIONS

This application is a continuation-in-part of application Ser. No. 807,988, filed Mar. 17, 1969, now abandoned for Surfactant Composition.

This invention relates to surfactant compositions. More particularly, this invention relates to novel liquid surfactant compositions and to methods for their preparation. This invention further relates to frozen confections containing such surfactant compositions and to method for the preparation of such confections.

In the frozen confection art, which includes the manufacture of compositions such as ice cream, mellorine, ice milk and sherbets, it is customary to include in the freezing mixture ingredients other than cream, milk, sugar and flavoring for the purpose of improving consistency and texture of the final product and to prevent the growth of ice crystals therein during storage. Accordingly, surfactants, sometimes called emulsifiers, and stabilizers are added in small amounts to nearly all of the frozen confections which are sold commercially at the present time. Surfactants serve several purposes when used in frozen confections; to wit, they assist in stabilizing the emulsion of fat in water, they improve whipping ability, they shorten the time required to produce a predetermined overrun and they help to produce a smoother, drier texture in the final product. Some conventional surfactants which have frequently been used in frozen confections are, for example, propylene glycol monostearate; glyceryl monostearate; polyoxyethylene oleate and polyoxyethylene stearate (with varying lengths of the ethylene oxide chain); higher fatty acid esters of sorbitol, sorbitan and other polyhydric alcohols, e.g., sorbitan monostearate; and the ethylene oxide derivatives of such fatty acid esters of polyhydric alcohols.

Of the various surfactants which have been used, or suggested for use, in the preparation of frozen confections, a few have been of the "liquid" variety intended for use with automated machinery adapted to the continuous manufacture of frozen confection as distinguished from the traditional "batch" method of manufacture. These, however, have usually suffered from one or more disadvantages arising from a tendency to gel upon standing, to develop a haze or, alternatively, to require excessive amounts of a suitable solubilizer to keep the fatty acid components of the surfactant from crystallizing out of solution.

It is, therefore, an object of this invention to provide a surfactant composition suitable for use in the preparation of a frozen confection, particularly with respect to manufacture by modern, automated equipment, which has increased fluidity and clarity.

It is another object of this invention to provide a surfactant composition which itself exhibits improved functionality when used in the preparation of frozen confections.

It is another object of this invention to provide processes for the preparation of said surfactant composition.

It is another object of this invention to provide a novel frozen confectionery composition.

It is another object of this invention to provide a method of preparation of said novel confectionery composition.

The foregoing objects and still further objects of this invention are broadly achieved by providing a surfactant composition suitable for use in the preparation of a frozen confection which is an ethylene oxide adduct of a sorbitan partial ester, or mixture of sorbitan partial esters, of both saturated and unsaturated long chain fatty acid. More specifically, the surfactant compositions of the present invention comprise ethylene oxide adducts of (1) a partial ester of sorbitan and mixed saturated and unsaturated long chain fatty acid and (2) a mixture of partial esters of sorbitan and saturated long chain fatty acid and of sorbitan and unsaturated long chain fatty acid.

The classes of sorbitan fatty acid partial esters from which the ethylene oxide adducts comprised by the surfactant composition of this invention may be prepared include those partial esters of sorbitan which are formed by the reaction of sorbitol with (a) a predominately saturated long chain fatty acid or mixture of such acid, (b) a predominately unsaturated long chain fatty acid, or mixture of such acid, or (c) a mixture of one or more of said predominately saturated long chain fatty acids and one or more of said predominately unsaturated long chain fatty acids.

The saturated and unsaturated long chain fatty acids suitable for use in preparing the surfactant compositions of this invention ordinarily are comprised by those fatty acids having from about 12 carbon atoms to about 22 carbon atoms in the aliphatic chain thereof. Exemplary of long chain saturated fatty acids which may be used are lauric acid, myristic acid, palmitic acid, stearic acid, margaric acid and the like. Exemplary of long chain unsaturated fatty acids which may be used are oleic acid, laurolenic acid, myristolenic acid, palmitolenic acid, linoleic acid, linolenic acid, etc. Commercial fatty acids which are mixtures of saturated and/or unsaturated fatty acids may be used, provided only that the ratio of saturated fatty acid moiety to unsaturated fatty acid moiety in the partial esters formed therewith is maintained within the limits hereinafter specified.

In general, sorbitan fatty acid partial esters may be prepared by reacting a selected quantity of sorbitol with a selected quantity of fatty acid in the presence of an alkaline catalyst at an elevated temperature and at atmospheric pressure. Although monoesters of sorbitan and long chain fatty acid are desirable in the preparation of ethylene oxide adducts comprised by the surfactant composition of the present invention, such monoesters are relatively difficult and expensive to produce in the pure state and, accordingly, the partial esters of sorbitan and fatty acid contemplated for use in the preparation of the surfactant composition of the present invention are ordinarily mixed partial esters consisting predominately of monoesters and diesters of sorbitan and long chain fatty acids. In the preparation of the said partial esters, therefore, a given molar quantity of sorbitol is reacted with a molar quantity of fatty acid considerably in excess of the theoretical amount required to form the monoester in order that all of the sorbitol present may be completely reacted in the process of preparation. The resulting product, although frequently called a sorbitan monoester, is in fact a mixed partial ester of sorbitan and long chain fatty acid. It will be understood that throughout this specification reference to commercial monoesters of sorbitan and long chain fatty acids is equivalent to reference to mixed partial esters thereof comprising both monoesters and diesters.

The technique of preparation of partial esters, or mixed partial esters, of sorbitan and long chain fatty acids is well known and information relating thereto easily available, as, for example, in the patents to Kenneth R. Brown, U.S. Pat. No. 2,322,820, issued June 29, 1943, and William C. Griffin, U.S. Pat. Nos. 2,374,931 and 2,380,166, issued May 1, 1945, and July 10, 1945, respectively, hereby incorporated by reference. As disclosed in the above-cited patents, methods of preparing partial esters of sorbitan and long chain fatty acids other than direct esterification may be used. The following is a specific example of the preparation of a mixed sorbitan partial ester from sorbitol and a mixture of saturated and unsaturated fatty acids:

EXAMPLE 1

744 grams of a commercial fatty acid comprising about 45 percent palmitic acid, 45 percent stearic acid, 5 percent myristic acid and about 5 percent unsaturated fatty acid, having an average molecular weight of about 268, and 513 grams of another commercial fatty acid comprising about 80.9 percent oleic acid, 8.1 percent linoleic acid, 0.4 percent linolenic acid and about 10.6 percent saturated acid, having an average molecular weight of about 280, are placed in a glass vessel together with 586 grams of sorbitol. The reactants are heated together, in the presence of 10.5 grams of 50 percent aqueous NaOH as catalyst and 7 grams of activated carbon, to a temperature of 245° C. The reaction mixture is maintained at that temperature and at atmospheric pressure for a period of 3 hours to complete the esterification, after which the catalyst is neutralized by adding 4 grams of 85 percent aqueous phosphoric acid, and the mixed partial ester of sorbitan and saturated and unsaturated fatty acid removed and filtered.

In accordance with this invention, surfactant compositions suitable for use in the preparation of frozen confections which are ethylene oxide adducts of sorbitan mixed partial esters of long chain fatty acids formed by the reaction of sorbitol with a mixture of saturated fatty acid and unsaturated fatty acid in the manner of the example given above, may be prepared with a mixture of such fatty acids having a ratio by weight of saturated acid to unsaturated acid within the range of about 1 to 1 to about 2 to 1, with a preferred weight ratio within the range of about 1.5 to 1 to about 1.8 to 1. In general, it has been found that optimum results are obtained with the use in frozen confections of surfactant compositions prepared from mixed partial sorbitan fatty acid esters which are themselves formed from reactant saturated and unsaturated fatty acids combined in proportions within the ranges indicated above, for should an excessive amount of saturated acid be present, a deleterious hazing and gelling of the surfactant product may result, while an excessive amount of unsaturated acid may significantly reduce the overrun of the frozen confection in which the surfactant product is used. It has also been found that an increase in the ratio of saturated acid to unsaturated acid results in a surfactant composition tending to increase the overrun of the frozen confection in which used, while a decrease in the ratio tends to increase the dryness of the final confectionery product.

Ethylene oxide adducts of mixed partial esters of sorbitan and long chain saturated and unsaturated fatty acid of the kind previously described and exemplified may be prepared by conventional processes of ethoxylation wherein the partial ester is etherified by heating with a preformed polyethylene glycol or, more conveniently, by reacting the partial ester with ethylene oxide in the presence of a suitable catalyst. The reaction of ethylene oxide with the partial ester is optimally accomplished at a temperature of about 140° to 143° C. and at a pressure about 50 p.s.i. In general, ethoxylation may be accomplished at a temperature range of about 60° C. to about 200° C., preferably about 40° C. to 160° C., and a pressure range from 0 p.s.i.g. to any positive pressure, preferably 0 to 100 p.s.i.g. Techniques of preparing ethoxylated partial esters of hexitans and fatty acids are well known and are exemplified in the patents to Griffin, supra. In accordance with this invention, the ethylene oxide adducts of partial esters of sorbitan and isosorbide contain from about 10 to about 50 mols, and preferably about 20 mols, of ethylene oxide per mol of ethoxylated partial ester. Fewer than about 10 mols of ethylene oxide per mol of ethoxylated ester result in a surfactant product which tends to have reduced clarity while more than about 50 mols of ethylene oxide per mol of ethoxylated ester tend to reduce the functionality of the surfactant in the frozen confection.

The following specifically exemplifies the preparation of an ethylene oxide adduct of sorbitan mixed partial ester comprised by the surfactant compositions of the present invention:

EXAMPLE 2

1,162 grams of the mixed partial ester of Example 1 is placed in a 2-gallon autoclave and 2,417 grams of ethylene oxide are added together with 11.8 grams sodium oleate. The mass is reacted at 143° C. and 40–50 p.s.i.g., after which it is deodorized at 120° C. under a vacuum of 25 mm. of mercury. The deodorized product is then finally filtered.

Pertinent physical characteristics of the product of Example 2 are tabulated below:

TABLE I

| | |
|---|---|
| Acid Number | 0.90 |
| Saponification Number | 50 |
| Hydroxyl Number | 80 |
| Color (Hess-Ives) | 9 |
| Viscosity (Centipoises) | 565 |
| % $H_2O$ | 2.44 |
| % Ash | 0.08 |
| pH | 6.2 |
| Specific gravity | 1.024 |

In a modified form of the invention, surfactant compositions useful in the preparation of frozen confections may be prepared by the ethoxylation of suitable mixtures of partial esters of sorbitan and long chain fatty acids. More specifically, in accordance with the method of this invention, surfactant compositions are prepared which are ethylene oxide adducts of a mixture of at least one partial ester of sorbitan and predominately saturated long chain fatty acid and at least one partial ester of sorbitan and predominately unsaturated long chain fatty acid. The ratio by weight of partial ester of sorbitan and saturated long chain fatty acid to partial ester of sorbitan and unsaturated long chain fatty acid in the mixture thereof which is ethoxylated to produce the surfactant composition of the present invention is such that the weight ratio of saturated fatty acid moiety contained in the mixture of esters lies within the range of about 1 to 1 to about 2 to 1. A weight ratio within the range of about 1.5 to 1 to about 1.8 to 1 is preferred. From the foregoing, it will be evident that the weight ratio of the saturated fatty acid moiety contained in the ethoxylated esters of this invention to the unsaturated fatty acid moiety contained therein lies within the range of about 1 to 1 to 2 to 1. The ratio of saturated acid moiety to unsaturated acid moiety in the surfactant composition is critical to the functionality thereof in frozen confections for reasons indicated earlier in connection with the preparation of ethoxylated mixed partial esters. The saturated and unsaturated fatty acids which may be used to prepare the partial esters of sorbitan and long chain saturated fatty acid and of sorbitan and long chain unsaturated fatty acid which are mixed in suitable proportion and subsequently ethoxylated to produce surfactant compositions in accordance with this invention, are those having from about 12 to about 22 carbon atoms previously specified above as suitable for preparation of mixed partial esters of sorbitan and both saturated and unsaturated long chain fatty acids and exemplified in connection therewith.

The following specifically exemplifies the preparation of a surfactant composition according to this invention which is an ethylene oxide adduct of a mixture of a partial ester of sorbitan and long chain saturated fatty acid and a partial ester of sorbitan and long chain unsaturated fatty acid:

EXAMPLE 3

Into a 10 gallon autoclave are introduced 10.8 pounds of a commercial monoester of sorbitan and a fatty acid comprising about 45 percent palmitic acid, 45 percent stearic acid, 5 percent myristic acid and about 5 percent unsaturated fatty acid, 7.18 pounds of a commercial monoester of sorbitan and a fatty acid comprising about 80.9 percent oleic acid, 8.1 percent linoleic acid, 0.4 percent linolenic acid and about 10.6 percent saturated acid, 37.2 pounds of ethylene oxide and 3.95 grams of powdered NaOH as catalyst. The ethylene oxide is added gradually at a temperature of 145° C. at a rate to maintain a pressure of about 50 p.s.i.g., and the reaction continued for a total time of 165 minutes. The autoclave is cooled to a temperature of 121° C., deodorized therein for 30 minutes at 10 mm. pressure, and bleached by treatment with 0.5 percent by weight of 35 percent aqueous hydrogen peroxide for 30 minutes at 95° C.

Pertinent physical characteristics of the product of Example 3 are set forth in Table II below:

TABLE II

| | |
|---|---|
| Acid Number | 0.65 |
| Saponification Number | 48 |
| Hydroxyl Number | 85 |
| Color (Hess-Ives) | 10 |
| % H₂O | 0.59 |

The following are further examples of the preparation of surfactant compositions of the present invention according to the general procedure of Example 3 wherein Partial Ester A designates the commercial monoester of sorbitan and a fatty acid mixture comprising about 45 percent palmitic acid, 45 percent stearic acid, 5 percent myristic acid and about 5% unsaturated acid and Partial Ester B designates a commercial monoester of sorbitan and a fatty acid mixture comprising 80.9 percent oleic acid, 8.1 percent linoleic acid, 0.4 percent linolenic acid and about 10.6 percent saturated acid:

EXAMPLES 4-6

| Partial ester A, pounds | Partial ester B, pounds | Ethylene oxide, pounds | Catalyst, grams | Temp., °C. | Pressure, p.s.i.g. | Reaction time, minutes |
|---|---|---|---|---|---|---|
| 1.97 | 1.305 | 6.73 | ¹ 5.8 | 145 | 50 | 300 |
| 1.99 | 1.32 | 6.73 | ¹ 5.8 | 145 | 50 | 450 |
| 60 | 39.8 | 235.5 | ² 21.9 | 145 | 50 | 150 |

¹ Sodium oleate.   ² Sodium hydroxide.

In the practice of the present invention improved frozen confectionery compositions may be prepared by incorporating thereinto the surfactant composition of this invention in amounts within the ranges of about from about 0.02 percent to about 0.2 percent by weight of the confectionery composition. A preferred range of percentage composition is from about 0.04 to about 0.1 percent by weight of the confectionery composition.

Illustrative of liquid surfactant compositions suitable for use in the preparation of frozen confections in accordance with this invention are ethoxylated partial ester of sorbitan and stearic and oleic acid containing 20 mols of ethylene oxide per mol of ethoxylated ester, ethoxylated partial ester of sorbitan and palmitic and oleic acid containing 20 mols of ethylene oxide per mol of ethoxylated ester, ethoxylated partial ester of sorbitan and lauric and linoleic acid containing 15 mols of ethylene oxide per mol of ethoxylated ester, ethoxylated partial ester of sorbitan and margaric and linoleic acid containing 25 mols of ethylene oxide per mol of ethoxylated ester, ethoxylated partial ester of sorbitan and myristic and laurolenic acid containing 20 mols of ethylene oxide per mol of ethoxylated ester, ethoxylated mixture of sorbitan and palmitic acid partial ester and sorbitan and oleic acid partial ester containing 30 mols of ethylene oxide per mol of ethoxylated mixture, ethoxylated mixture of sorbitan and stearic acid partial ester and sorbitan and oleic acid partial ester containing 50 mols of ethylene oxide per mol of ethoxylated mixture, ethoxylated mixture of sorbitan and lauric acid partial ester and sorbitan and laurolenic acid partial ester containing 35 mols of ethylene oxide per mol of ethoxylated mixture, ethoxylated mixture of sorbitan and margaric acid partial ester and sorbitan and linolenic acid partial ester containing 40 mols of ethylene oxide per mol of ethoxylated mixture and ethoxylated mixture of sorbitan and myristic acid partial ester and sorbitan and palmitolenic acid partial ester containing 45 mols of ethylene oxide per mol of ethoxylated mixture.

The following are specific examples of ice cream confections prepared according to the method of this invention wherein the principal dry ingredients, sugar, milk powder and surfactant are added together with a selected stabilizer to the liquid ingredients comprising cream and water, the resulting mixture of the ingredients is homogenized at 2,500 total p.s.i.g., pasteurized at 160° F. for 20 minutes, the temperature of the mixture lowered to 40° F. and, after being held at that temperature for a period of time, frozen at a temperature between 20° F. and 25° F. For shipping purposes, the final product should be held at a temperature of −20° F. for at least 24 hours. In all of the following examples, the following ice cream formula is used:

TABLE III

| Formula | |
|---|---|
| Ingredient | Percent by Weight |
| Butterfat (40% cream) | 12 |
| Serum solids (nonfat dry milk solids) | 11 |
| Sucrose (sugar) | 15 |
| Stabilizer (carboxymethyl cellulose) | 0.2 |
| Surfactant | 0.02 to 0.2 |
| Water | Remainder |

EXAMPLES 7-15

| Surfactant | Percent by weight | Maximum overrun, percent | Minimum dryness | Dryness at maximum overrun | Time to maximum overrun, min. | Body | Texture | Ribbon |
|---|---|---|---|---|---|---|---|---|
| Surfactant composition of Example: | | | | | | | | |
| 2 | 0.05 | 93.5 | 8 | 9 | 18 | Good | Good | Good. |
| 4 | 0.04 | 92.0 | 9 | 9 | 15 | do | do | Do. |
| 5 | 0.04 | 94.5 | 8 | 9 | 15 | do | do | Do. |
| 2 | 0.02 | 82.5 | 10 | 11 | 16 | do | Fair | Do. |
| 2 | 0.1 | 93.5 | 7 | 7 | 14 | do | Good | Do. |
| 2 | 0.02 | 85.5 | 12 | 12 | 16 | do | Fair | Do. |
| 4 | 0.1 | 100.5 | 8 | 8 | 14 | do | Good | Do. |
| 4 | 0.03 | 93.5 | 11 | 12 | 15 | Fair | Fair | Fair |
| 5 | 0.1 | 92.0 | 8 | 8 | 16 | Good | Good | Good. |

We claim:

1. A liquid ice cream emulsifier composition consisting essentially of a member selected from the group consisting of (a) the ethylene oxide adduct of a mixture of a sorbitan partial ester of a saturated long chain fatty acid and a sorbitan partial ester of an unsaturated long chain fatty acid, and (b) the ethylene oxide adduct of a sorbitan partial ester of a mixture of a saturated long chain fatty acid and an unsaturated long chain fatty acid; wherein the weight proportion of saturated fatty acid moieties to unsaturated fatty acid moieties in said mixtures is from about 1/1 to about 2/1 and wherein the said ethylene oxide adducts contain from about 15 to about 50 oxyethylene groups per mol of ethoxylated ester.

2. An ice cream emulsifier composition according to claim 1 which is the ethylene oxide adduct of a sorbitan partial ester of a mixture of fatty acids predominantly comprising stearic, palmitic, oleic, and linoleic acids.

3. An ice cream emulsifier composition according to claim 1 which is the ethylene oxide adduct of a mixture of a sorbitan partial ester of a saturated fatty acid comprising principally palmitic and stearic acids and a sorbitan partial ester of an unsaturated fatty acid comprising principally oleic and linoleic acids.

4. An ice cream emulsifier composition according to claim 2 which contains about 20 oxyethylene groups per mol of adduct and in which the mixture of fatty acids predominantly comprises stearic and oleic acids.

5. An ice cream emulsifier composition according to claim 3 which contains about 20 oxyethylene groups per mol of adduct and in which the said saturated fatty acid is principally stearic acid and the said unsaturated fatty acid is principally oleic acid.

6. A method of preparing a liquid ice cream emulsifier composition which comprises the steps of (a) reacting sorbitol with a mixture of a saturated long chain fatty acid and an unsaturated long chain fatty acid, the proportion of saturated fatty acid to unsaturated fatty acid in said mixture being from about 1/1 to about 2/1 by weight, to form a mixed sorbitan partial ester and then (b) reacting said mixed partial ester with from about 15 to about 50 mols of ethylene oxide per mol of partial ester to form an ethoxylated mixed partial ester.

7. A method of preparing a liquid ice cream emulsifier composition which comprises the steps of (a) reacting sorbitol with a predominantly saturated long chain fatty acid to form a sorbitan partial ester, (b) reacting sorbitol with a predominantly unsaturated long chain fatty acid to form a second sorbitan partial ester, (c) mixing said sorbitan partial esters to provide a proportion of saturated fatty acid moieties to unsaturated fatty acid moieties in the resulting mixture of from 1/1 to 2/1 by weight, and then (d) reacting said mixture of sorbitan partial esters with an amount of ethylene oxide to provide from about 15 to about 50 oxyethylene groups per mol of ethoxylated mixture.

8. In a frozen confection comprising cream, milk, sugar, flavoring agent, surfactant and stabilizer, the improvement which comprises the incorporation, as surfactant, of from 0.02 to 0.2 percent by weight of an ice cream emulsifier composition in accordance with claim 1.

9. In a frozen confection comprising cream, milk, sugar, flavoring agent, surfactant and stabilizer, the improvement which comprises the incorporation, as surfactant, of from 0.02 to 0.2 percent by weight of an ice cream emulsifier composition in accordance with claim 2.

10. In a frozen confection comprising cream, milk, sugar, flavoring agent, surfactant and stabilizer, the improvement which comprises incorporation, as surfactant, of from 0.02 to 0.2 percent by weight of an ice cream emulsifier in accordance with claim 3.

11. In a frozen confection comprising cream, milk, sugar, flavoring agent, surfactant and stabilizer, the improvement which comprises the incorporation, as surfactant, of from 0.02 to 0.2 percent by weight of an ice cream emulsifier composition in accordance with claim 4.

12. In a frozen confection comprising cream, milk, sugar, flavoring agent, surfactant and stabilizer, the improvement which comprises the incorporation, as surfactant, of from 0.02 to 0.2 percent by weight of an ice cream emulsifier in accordance with claim 5.

* * * * *